(12) United States Patent
Morioka

(10) Patent No.: US 9,251,789 B2
(45) Date of Patent: Feb. 2, 2016

(54) SPEECH-RECOGNITION SYSTEM, STORAGE MEDIUM, AND METHOD OF SPEECH RECOGNITION

(71) Applicant: SEIKO EPSON CORPORATION, Tokyo (JP)

(72) Inventor: Kiyotaka Morioka, Hino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 289 days.

(21) Appl. No.: 13/924,809

(22) Filed: Jun. 24, 2013

(65) Prior Publication Data

US 2014/0012578 A1 Jan. 9, 2014

(30) Foreign Application Priority Data

Jul. 4, 2012 (JP) ................................. 2012-150348

(51) Int. Cl.
*G10L 15/00* (2013.01)
*G10L 15/22* (2006.01)
*G10L 15/14* (2006.01)
*G10L 25/24* (2013.01)

(52) U.S. Cl.
CPC ................. *G10L 15/22* (2013.01); *G10L 15/14* (2013.01); *G10L 25/24* (2013.01)

(58) Field of Classification Search
CPC ......... G10L 15/00; G10L 15/10; G10L 15/14; G10L 25/24
See application file for complete search history.

(56) References Cited

U.S. PATENT DOCUMENTS

| 5,444,817 | A * | 8/1995 | Takizawa ..................... 704/254 |
| 2006/0136206 | A1 * | 6/2006 | Ariu et al. ..................... 704/246 |
| 2009/0259466 | A1 * | 10/2009 | Stubley et al. ................ 704/240 |

FOREIGN PATENT DOCUMENTS

| JP | A-10-207486 | 8/1998 |
| JP | A-2001-228890 | 8/2001 |

* cited by examiner

*Primary Examiner* — Daniel Abebe
(74) *Attorney, Agent, or Firm* — Oliff PLC

(57) ABSTRACT

A speech recognition system that recognizes speech data is provided. The speech recognition system includes a speech recognition part that performs speech recognition of the speech data, and calculates a likelihood of the speech data with respect to a registered word that is pre-registered, a reliability judgment part that performs reliability judgment on the speech recognition based on the likelihood, and a judgment reference change processing part that changes a judgment reference for the reliability judgment, according to an utterance speed of the speech data.

8 Claims, 4 Drawing Sheets

SPEECH DATA 1 "KON-NICHI-WA" (2 SECONDS)
SPEECH DATA 2 "KON-NICHI-WA" (2 SECONDS)

| REGISTERED WORD | REFERENCE LIKELIHOOD DIFFERENCE JUDGMENT THRESHOLD | CURRENT LIKELIHOOD DIFFERENCE JUDGMENT THRESHOLD | RECOGNITION RESULT OF SPEECH DATA 1 (LIKELIHOOD) | RECOGNITION RESULT OF SPEECH DATA 2 (LIKELIHOOD) |
|---|---|---|---|---|
| KON-NICHI-WA | 40 | 40 | 78 | 50 |
| OHAYO | 50 | 50 | 30 | 30 |
| KON-BAN-WA | 41 | 41 | 20 | 80 |
| REGISTERED WORD AT FIRST RANK | | | KON-NICHI-WA | KON-BAN-WA |
| LIKELIHOOD DIFFERENCE BETWEEN FIRST RANK AND SECOND RANK | | | 48 | 30 |
| RELIABILITY JUDGED BY USING CURRENT LIKELIHOOD DIFFERENCE JUDGMENT THRESHOLD | | | ○ (NOTE 1) | × (NOTE 2) |

(NOTE 1) 78-30=48>40
(NOTE 2) 80-50=30<41

FIG. 4

SPEECH DATA 3 "KON-NICHI-WA" (3 SECONDS)
SPEECH DATA 4 "KON-NICHI-WA" (3 SECONDS)

| REGISTERED WORD | REFERENCE LIKELIHOOD DIFFERENCE JUDGMENT THRESHOLD | CURRENT LIKELIHOOD DIFFERENCE JUDGMENT THRESHOLD | RECOGNITION RESULT OF SPEECH DATA 3 (LIKELIHOOD) | RECOGNITION RESULT OF SPEECH DATA 4 (LIKELIHOOD) |
|---|---|---|---|---|
| KON-NICHI-WA | 40 | 50 | 117 | 75 |
| OHAYO | 50 | 62.5 | 45 | 45 |
| KON-BAN-WA | 41 | 52 | 30 | 120 |
| REGISTERED WORD AT FIRST RANK | | | KON-NICHI-WA | KON-BAN-WA |
| LIKELIHOOD DIFFERENCE BETWEEN FIRST RANK AND SECOND RANK | | | 62 | 45 |
| RELIABILITY JUDGED BY USING CURRENT LIKELIHOOD DIFFERENCE JUDGMENT THRESHOLD | | | ○ (NOTE 3) | × (NOTE 4) |

(NOTE 3) 117-45=62>50
(NOTE 4) 120-75=45<52
(NOTE 5) 120-55=45>41

FIG. 5

SPEECH-RECOGNITION SYSTEM, STORAGE MEDIUM, AND METHOD OF SPEECH RECOGNITION

The entire disclosure of Japan Patent Application No. 2012-150348, filed Jul. 4, 2012 is expressly incorporated by reference herein.

BACKGROUND

1. Technical Field

Several aspects of the present invention relate to speech recognition systems, speech recognition programs, recording mediums, and speech recognition methods.

2. Related Art

According to a method generally used for speech recognition, an input pattern that consists of parameters representing features of an inputted utterance obtained by analyzing the utterance is processed into data, the unknown input pattern is compared with registered patterns (for example, dictionary data) of a plurality of utterances compiled in advance into a database through pattern matching, and a registered pattern among the dictionary data with a greater likelihood is outputted as a recognition result. Here, the likelihood is a parameter that represents the likelihood of a candidate speech recognition result, and is obtained, associated with a Hidden Markov model that statistically models spectral fluctuations and temporal fluctuations of an utterance by numerous training samplings. Note that, in many cases, an inputted speech may be divided into a plurality of frames and processed.

Laid-open Japanese patent application HEI 10-207486 (Patent Document 1) describes a speech recognition method in which likelihoods are obtained using Hidden Markov Models, likelihood differences that are differences between the likelihood of a speech recognition result at a first rank and the likelihood of each of respective speech recognition results at ranks including a second rank and below are obtained, and only those of the likelihood differences whose speech recognition is recognized as having been properly performed are selected based on a predetermined likelihood difference judgment threshold as candidates of correct recognition results.

However, in speech recognition that performs matching, using Hidden Markov Models, the slower the rate of speech (the utterance speed), the greater the number of frames becomes by the amount slowed down, such that likelihoods of recognition results tend to have greater values. Accordingly, likelihood differences tend to spread wider. As a result, the slower the utterance speed, the greater the values of likelihood differences become, such that there is a tendency to judge wrong speech recognition results of the first rank as correct results.

By setting the likelihood difference judgment threshold higher, the reliability in answers can be secured even when the utterance speed is slow but, in reverse, the rate of recognition lowers when the utterance speed is faster.

SUMMARY OF THE INVENTION

In accordance with an advantage of some aspects of the invention, at least one of the problems or objectives described above can be solved, and the invention can be realized as application examples or embodiments described below.

APPLICATION EXAMPLE 1

A speech recognition system, in accordance with the present application example, pertains to a speech recognition system that recognizes speech data, and includes a speech recognition part that performs speech recognition of the speech data, and calculates a likelihood of the speech data with respect to a registered word that is pre-registered, a reliability judgment part that performs reliability judgment on the speech recognition based on the likelihood, and a judgment reference change processing part that changes a judgment reference for the reliability judgment, according to an utterance speed of the speech data.

According to the configuration described above, the speech recognition part performs speech recognition of speech data, and calculates a likelihood of the speech data with respect to a registered word that has been registered in advance, the reliability judgment part judges the reliability based on the likelihood, and the judgment reference change processing part changes the judgment reference for the reliability judgment, according to the utterance speed of the user. As a result, it is possible to provide a speech recognition system that is capable of reducing error speech recognition (or simply, error recognition) that may occur as the utterance speed of the user changes.

When the same word or phrase is uttered, its likelihood is often calculated greater in a slower utterance speed of the user than a faster utterance speed. Accordingly, when the reliability judgment is performed based on the likelihood, the judgment reference may be changed according to the utterance speed of the user, whereby a speech recognition system with improved reliability can be composed.

APPLICATION EXAMPLE 2

In the speech recognition system in accordance with the application example described above, the reliability judgment part may perform the reliability judgment for judging the reliability of the speech recognition based on a comparison result between a likelihood difference judgment threshold and a likelihood difference that is a difference in the likelihood among a plurality of the registered words obtained as a result of the speech recognition, and the judgment reference change processing part may change the likelihood difference judgment threshold to be used for the reliability judgment to have a greater value, as the utterance speed becomes slower.

According to the composition described above, the reliability judgment part judges the reliability of the speech recognition based on comparison between a likelihood difference judgment threshold and a likelihood difference among the plurality registered words, and the likelihood difference judgment threshold value is changed to have a greater value as the utterance speed of the user becomes slower, whereby a speech recognition system that is capable of reducing an increase in error recognition can be provided.

As described above, when the same word or phrase is spoken, its likelihood is often calculated greater in a slower utterance speed of the user than a faster utterance speed. Also, in view of likelihood differences between different registered words, the likelihood difference tends to become greater as the utterance speed becomes slower. Therefore, if the likelihood difference judgment threshold value is fixed without regard to the utterance speed of the user, when the utterance speed is slow, it can be assumed that the likelihood difference between a registered word whose likelihood is at the first rank and a registered word at the second rank in error recognition may become greater than the likelihood difference judgment threshold value. In such a case, despite the error recognition, it is judged that correct speech recognition (correct recognition) has been made so that a result of error recognition would be outputted as a result of correct recognition from the speech recognition system. Occurrence of such incidents can be reduced, through changing the likelihood difference judgment threshold value according to the utterance speed of the user.

APPLICATION EXAMPLE 3

In the speech recognition system in accordance with the application example described above, the likelihood difference judgment threshold is set corresponding to an acoustic model of each of the registered words, and the reliability judgment part may use the likelihood difference judgment threshold set corresponding to an acoustic model of a first registered word whose likelihood obtained as a result of the speech recognition is at the first rank, thereby judging the reliability of the speech data being the first registered word.

According to the composition described above, likelihood difference judgment thresholds are set corresponding to acoustic models of the registered words, a likelihood difference judgment threshold set corresponding to an acoustic model of a first registered word whose likelihood is the first rank is used by the reliability judgment part, such that the likelihood difference judgment threshold suitable for each acoustic model of the first registered word can be set, and therefore reliability judgment results can be made better.

APPLICATION EXAMPLE 4

In the speech recognition system in accordance with the application example described above, the judgment reference change processing part may preferably judge the utterance speed of the speech data based on the recognition time in speech recognition of the speech data and the number of vowels in an acoustic model of the registered word.

According to the composition described above, by judging the utterance speed of the speech data based on the recognition time in speech recognition of the speech data and the number of vowels in an acoustic model of the registered word, an utterance speed, at which a desirable likelihood difference judgment threshold can be selected, can be obtained. Here, the number of vowels in an acoustic model may be the number of vowels in phonemes resolved from the acoustic model.

APPLICATION EXAMPLE 5

In the speech recognition system in accordance with the application example described above, the reliability judgment part may obtain the likelihood difference between the first registered word and a second registered word whose likelihood is at the second rank, and may preferably judge the reliability of the speech data being the first registered word based on the result of comparison between the likelihood difference and the likelihood difference judgment threshold.

According to the composition described above, by judging the reliability of the speech data being the first registered word based on the result of comparison between the difference in likelihood between the first registered word and the second registered word and the likelihood difference judgment threshold, a speech recognition system that provides reliable speech recognition results can be composed.

APPLICATION EXAMPLE 6

A speech recognition program, in accordance with the present application example, renders a computer to function as a speech recognition part that performs speech recognition of speech data, and calculates a likelihood of the speech data with respect to a registered word that is pre-registered, a reliability judgment part that performs reliability judgment on the speech recognition based on the likelihood, and a judgment reference change processing part that changes a judgment reference for the reliability judgment, according to an utterance speed of the speech data.

According to the composition described above, by providing a program that renders a computer to function as a speech recognition part that performs speech recognition of speech data, and calculates a likelihood of the speech data with respect to a registered word that has been registered in advance, a reliability judgment part that judges the reliability in speech recognition based on the likelihood, and a judgment reference change processing part that changes the judgment reference for the reliability judgment, according to the utterance speed of the speech data, a highly reliable speech recognition system can be composed.

APPLICATION EXAMPLE 7

A storage medium in accordance with the present application example stores the speech recognition program in accordance with the application example described above.

According to the composition described above, by using a recording medium that stores the program described above, the program for composing a reliable speech recognition system can be readily carried.

APPLICATION EXAMPLE 8

A speech recognition method in accordance with the present application example pertains to a speech recognition method for performing speech recognition of speech data, and includes a speech recognition step of performing the speech recognition and calculating a likelihood of the speech data with respect to a registered word that is pre-registered, a judgment reference change processing step of changing a judgment reference for reliability judgment according to an utterance speed of the speech data, and a reliability judgment step of performing reliability judgment on the speech recognition based on the likelihood.

According to the method described above, by using a method that includes a speech recognition step of performing speech recognition and calculating a likelihood of speech data with respect to a registered word that has been registered in advance, a judgment reference change processing step of changing a judgment reference for reliability judgment according to the utterance speed of the speech data, and a reliability judgment step of judging the reliability in speech recognition based on the likelihood, a highly reliable speech recognition system can be composed.

BRIEF DESCRIPTION OF THE DRAWINGS

FIG. 4 is a table for explaining examples of reliability judgment according to utterance speeds in accordance with an embodiment of the invention.

FIG. 5 is a table for explaining examples of reliability judgment according to utterance speeds in accordance with an embodiment of the invention.

PREFERRED EXEMPLARY EMBODIMENTS

Preferred embodiments of the invention are described in detail below with reference to the accompanying drawings. The drawings to be used are provided for the convenience of description. It is noted that the embodiments described below do not limit the content of the invention recited in the scope of the patent claims. Furthermore, all of the compositions to be described below may not necessarily be indispensable compositions of the invention.

First Embodiment

Figure 1:
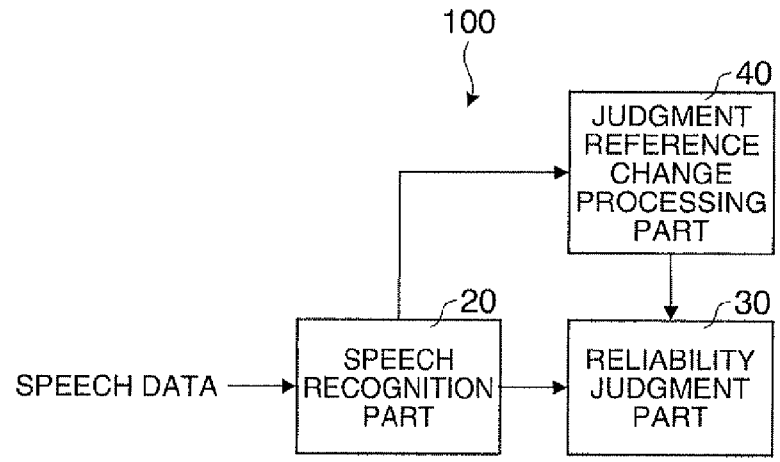
FIG. 1 is a functional block diagram of a speech recognition system in accordance with an embodiment of the invention.

FIG. 1 is a functional block diagram of a speech recognition system 100 of the embodiment. The speech recognition system 100 may be realized by, for example, a computer, or may be realized by dedicated hardware.

The speech recognition system 100 is a speech-recognition system that performs speech recognition of speech data, and includes a speech recognition part 20, a reliability judgment part 30, and a judgment reference change processing part 40. The speech recognition part 20 is a part where the speech recognition of speech data is performed, and the likelihood of the speech data with respect to a registered word registered in advance is calculated. The reliability judgment part 30 is a part where the reliability of the speech recognition of the speech data is judged based on likelihoods of a plurality of registered words, which are obtained as a result of the speech recognition of the speech data. The judgment reference change processing part 40 is a part where the judging reference for the reliability judgment is changed according to the utterance speed of the speech data.

In the speech recognition performed by the speech recognition system 100, the likelihood that is a parameter indicative of the probability of speech data being a registered word may be obtained through matching the amount of features obtained based on the speech data and an acoustic model corresponding to the registered word using a known speech recognition technique. The registered word may be composed of one word, or may be composed of plural words.

The utterance speed of speech data may be any index for judging the utterance speed concerning speech data as to whether a speech concerning the speech data is spoken at a normal speed, spoken at a speed slower than the normal speed, or spoken at a speed faster than the normal speed. Note here that the normal speed may be understood to be an average utterance speed.

The speech recognition system 100 may calculate the utterance speed of speech data based on, for example, the time required for speech recognition of the speech data (speech recognition time) and the length of a registered word that is subject to the speech recognition matching (or a registered word whose likelihood is at the first rank). Alternatively, the speech recognition system 100 may calculate the utterance speed of speech data based on, for example, the number of vowels and the number of consonants in the speech data, and the length of a registered word. Note here that the length of a registered word may refer to the number of vowels in an acoustic model of the registered word, or may be a value calculated through weighing the number of vowels and the number of consonants by a predetermined rate.

Moreover, the speech recognition system 100 may calculate the utterance speed through, for example, providing each registered word with a reference time (for example, the time or the number of frames required for speaking the registered word at a normal speed), and comparing the utterance time of the current speech data with the reference time.

The reliability judgment for speech recognition of speech data may be a judgment based on the reliability of a registered word judged to be corresponding (i.e., a registered word whose likelihood is at the first rank), as a result of the speech recognition, for example. The judgment result may be indicated by the presence or absence of reliability with respect to a speech recognition result (a recognition result that the speech data is a predetermined registered word), or indicated by the value of reliability in ratio or in percentage.

Moreover, the speech recognition system 100 may indicate the result of reliability judgment as being a case where the speech recognition is possible (when a registered word judged to be corresponding to speech data exists) or a case where the speech recognition is impossible (when a registered word judged to be corresponding to speech data does not exist). At this time, the speech recognition system 100 may judge, based on the reliability, as to whether speech recognition is possible for speech data that is subject to recognition. One example of the reliability will be described later.

The result of the reliability judgment can be used in many ways. For example, the speech recognition system 100 may judge that the speech recognition was performed when the reliability of a registered word that was judged to be matching as a result of speech recognition (i.e., a registered word whose likelihood is at the first rank) is greater than a predetermined reference level. The speech recognition system 100 may judge, based on the reliability, as to whether speech recognition is possible for the speech data. Moreover, the speech recognition system 100 may adopt the result when the reliability of a registered word that was judged to be matching as a result of speech recognition (i.e., a registered word whose likelihood is at the first rank) is greater than a predetermined reference level.

Also, the reliability judgment part 30 may compare a likelihood difference among likelihoods for plural registered words obtained as a result of speech recognition of speech data with a likelihood difference judgment threshold, and may perform reliability judgment, that judges the reliability of the speech recognition, based on the result of comparison. The judgment reference change processing part 40 may change the likelihood difference judgment threshold used for the reliability judgment to have a greater value, as the utterance speed becomes slower.

Also, the reliability judgment part 30 may obtain a likelihood difference between a registered word whose likelihood is at the first rank obtained as a result of speech recognition of speech data and another registered word (for example, a registered word whose likelihood is at the second rank), compare the likelihood difference with a likelihood difference judgment threshold, and perform reliability judgment, that judges the reliability of the registered word whose likelihood is at the first rank, based on the result of comparison.

When the utterance speed is slow, the speech recognition time for speech data becomes longer and the number of frames becomes greater, compared with a faster utterance speed, and therefore there is a greater possibility that the value of likelihood as the total value of matching results in units of frames tends to become greater, and the value of likelihood difference also tends to become greater as the utterance speed becomes slower. Therefore, the slower the utterance speed, the more likely wrong answers are judged as correct answers, so that the reliability of answers tends to decrease. However, this can be avoided by changing the likelihood difference judgment threshold such that the likelihood difference judgment threshold used for reliability judgment becomes greater as the utterance speed becomes slower.

The likelihood difference judgment threshold is set corresponding to an acoustic model of a registered word. The reliability judgment part 30 may judge the reliability in that the speech data matches a registered word whose likelihood is at the first rank, using the likelihood difference judgment threshold that is set corresponding to an acoustic model of the registered word whose likelihood is at the first rank obtained as the result of speech recognition of speech data.

Moreover, the judgment reference change processing part 40 may judge the utterance speed of the speech data to be recognized, based on the number of vowels detected in the speech data to be recognized and the number of vowels of an acoustic model corresponding to a predetermined registered word (an acoustic model whose likelihood is at the first rank).

When the utterance speed slows down, the duration of time in which vowels are uttered often becomes longer than the usual case. Therefore, based on the number of vowels of an acoustic model corresponding to a predetermined registered word, the judgment reference change processing part 40 may obtain the length of the registered word, and calculate the utterance speed by using the length of the registered word. Also, the judgment reference change processing part 40 may obtain the length of a registered word by weighing the number of consonants and the number of vowels of an acoustic model corresponding to the registered word by a predetermined rate, and calculate the utterance speed by using the length of the registered word.

Moreover, the speech recognition part 20 may calculate likelihoods for plural registered words that are choices prepared in advance for the speech data. The reliability judgment part 30 may obtain a likelihood difference between a registered word whose likelihood obtained as a result of the speech recognition of the speech data is at the first rank and a registered word whose likelihood is at the second rank, and compare the likelihood difference with a likelihood difference judgment threshold, thereby judging, based on the comparison result, the reliability of the speech data being the registered word whose likelihood is at the first rank.

Also, the speech recognition part 20 may extract the amount of features (feature vectors, etc.) for speech data by a Hidden Markov Model (HMM) technique, prepare an acoustic model formed by a Hidden Markov Model technique corresponding to the registered word, and perform speech recognition by matching that uses a Hidden Markov Model technique for the amount of features and the acoustic model of the predetermined registered word.

Embodiment Example 1

Figure 2:
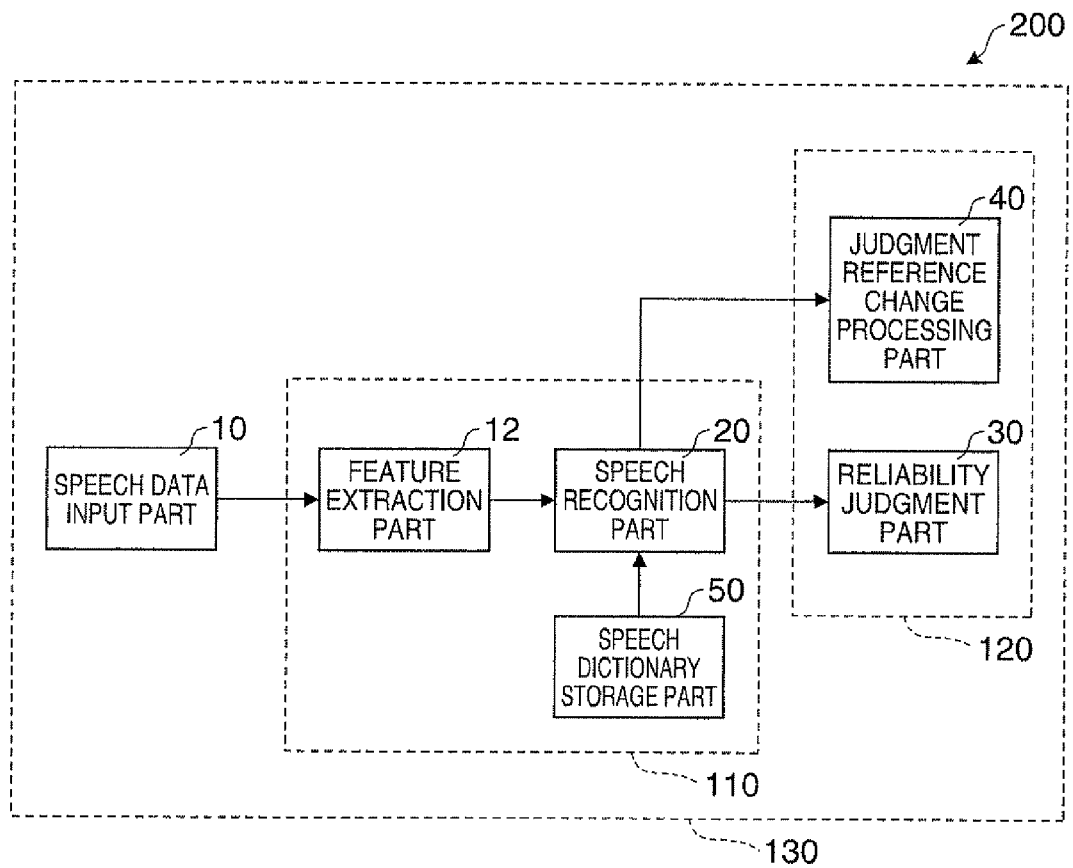
FIG. 2 shows an example of a composition of the speech recognition system in accordance with the embodiment.

FIG. 2 shows an example of the composition of the speech recognition system in accordance with the present embodiment. Note that components of the present embodiment having functions similar to those shown in the functional block described above may be appended with the same names and reference numbers, and their description in the present embodiment example may be omitted.

The speech recognition system 200 of the present embodiment example includes a speech data input part 10, a feature extraction part 12, a speech recognition part 20, a reliability judgment part 30, a judgment reference change processing part 40, and a speech dictionary storage part 50.

The speech data input part 10 is a part where speech data is input, and can be achieved by, for example, a microphone, etc. that inputs an utterance of the speaker. The feature extraction part 12 may perform A/D conversion, noise removal with a filter, fast Fourier transform (FFT), and Cepstrum calculation, etc. to inputted speech data, thereby extracting feature vectors.

The speech dictionary storage part 50 is realized by a storage part, and stores acoustic models of multiple registered words used for speech recognition and the like. Note that the storage part stores programs, data, etc., and its function can be realized by hardware, such as, a computer-readable medium (for example, an optical disk, such as, CD, DVD, etc.), a magnet-optical disk (MO), a magnetic disk, a hard disk, a magnetic tape, a memory (ROM), or the like.

The speech recognition part 20, the reliability judgment part 30, and the judgment reference change processing part 40 can be realized by executing programs that render a dedicated or general-purpose processor to function as the speech recognition part 20, the reliability judgment part 30, and the judgment reference change processing part 40. Also, at least a part of the speech recognition part 20, the reliability judgment part 30, and the judgment reference change processing part 40 may be realized by dedicated hardware (circuits).

For example, the speech recognition system 200 may be realized by an integrated circuit device (a semiconductor integrated circuit device) 110 including the feature extraction part 12, the speech recognition part 20, and the speech dictionary storage part 50, and a host system 120 including the reliability judgment part 30, and the judgment reference change processing part 40. Note that the speech recognition system 200 includes an input device for operation, and a display part that displays a menu for operation, speech recognition results, and the like, though not shown in the figure.

Alternatively, the speech recognition system 200 may be realized by an integrated circuit device 130 (a semiconductor integrated circuit device) including the feature extraction part 12, the speech recognition part 20, the speech dictionary storage part 50, the reliability judgment part 30, and the judgment reference change processing part 40.

Figure 3A:
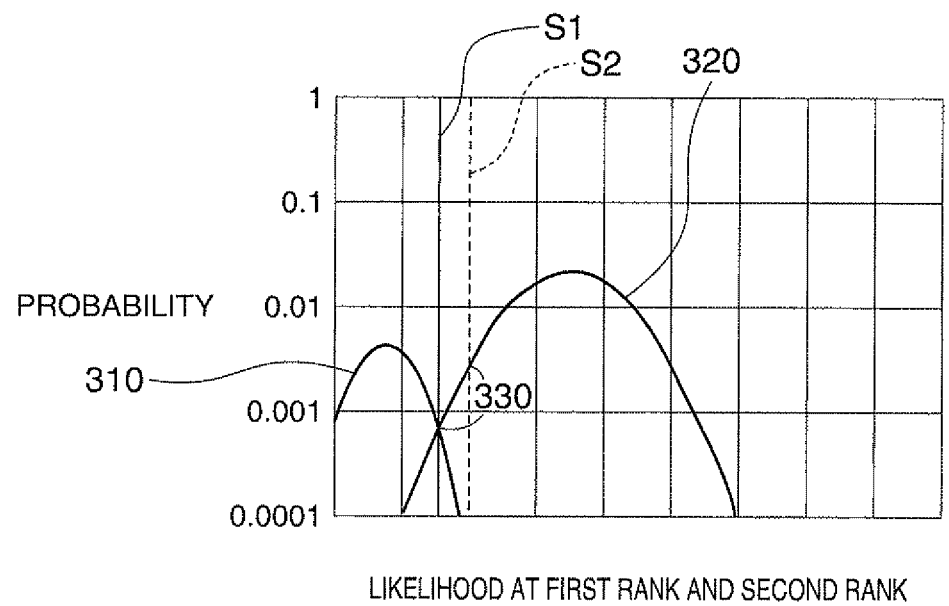
FIGS. 3A and 3B are graphs showing distributions of correct recognition and error recognition of likelihoods of speech recognition results.
Figure 3B:
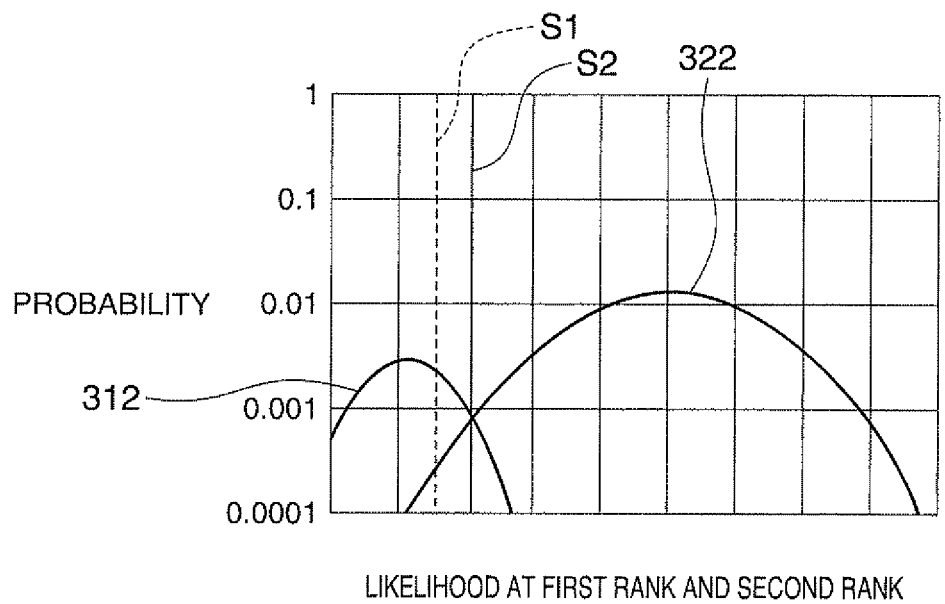

FIGS. 3A and 3B are graphs showing distributions of likelihood differences in correct recognition (correct recognition distribution) and in error recognition (error recognition distribution) between a registered word whose likelihood is at the first rank and a registered word whose likelihood is at the second rank. The horizontal axis shows likelihood differences, and the vertical axis shows appearance probability.

FIG. 3A is a graph showing a correct recognition distribution 320 and an error recognition distribution 310 in the case of speaking at the normal speed. The correct recognition distribution 320 graphically shows the appearance probability obtained from plural samples of likelihood differences when the speech data is correctly recognized as a registered word intended by the speaker. The error recognition distribution 310 graphically shows the appearance probability obtained from plural samples of likelihood differences when the speech data is erroneously recognized as a registered word different from what the speaker intended.

FIG. 3B is a graph showing a correct recognition distribution 322 and an error recognition distribution 312 in the case of speaking slower than the normal speed.

As shown in FIGS. 3A and 3B, the likelihood difference in the correct recognition tends to become greater compared to the error recognition. Therefore, by comparing the likelihood difference between registered words whose likelihood are respectively at the first rank and the second rank, with a predetermined threshold, the reliability as to whether the speech data is the registered word whose likelihood is at the first rank can be judged.

S1 in FIG. 3A shows an example of the likelihood difference judgment threshold at the normal speed. In this case, if the likelihood difference between the registered word whose likelihood is at the first rank and the registered word at the second rank is at the likelihood difference judgment threshold S1 or more, the probability of correct recognition rises more than the probability of error recognition, and therefore it can be judged that the reliability of the speech data being the registered word whose likelihood is at the first rank is high. However, if the likelihood difference is less than the likelihood difference judgment threshold S1, the probability of correct recognition becomes lower than the probability of error recognition, and therefore it can be judged that the reliability of the speech data being the registered word whose likelihood is at the first rank is low. The case where the reliability is judged to be high by the reliability judgment part 30 may be judged as correct recognition, and the registered word whose likelihood at the first rank may be displayed in the display part as the result of speech recognition with respect to the speech data.

Also, how the judgment of reliability is used may be entrusted to an application program executed by the speech recognition system 200. For example, even when the reliability is judged to be low, the registered word whose likelihood is at the first rank may be displayed in the display part together with a sign or a numerical value indicative of the reliability. The sign or the numerical value indicative of the reliability may be calculated, for example, from a ratio between the number of appearances of the correct recognition distribution 320 and the number of appearances of the error recognition distribution 310 corresponding to likelihood difference values in the graph of FIG. 3A.

To raise the reliability of the speech recognition result by the speech recognition system 200, in FIG. 3A, the likelihood difference judgment threshold may be moved to the side where the likelihood difference becomes greater than the likelihood difference judgment threshold S1 (for example, a likelihood difference judgment threshold S2 in FIG. 3A). In this case, even when the likelihood difference is smaller than the likelihood difference judgment threshold S2, cases where the probability of correct recognition is higher than the probability of error recognition exist. However, the probability of displaying that they are error recognition becomes lower compared with the case where the likelihood difference judgment threshold is S1. Therefore, the reliability of correct recognition when they are judged as correct recognition rises, though the speech recognition rate (the probability of indicating correct recognition) of the speech recognition system 200 lowers. When the result of speech recognition by the speech recognition system 200 is to be used for certain control, it is desirable to set the likelihood difference judgment threshold to a value greater than the likelihood difference judgment threshold S1, in order to prevent problems caused by error control.

In reverse, in FIG. 3A, when the likelihood difference judgment threshold is moved to the side where the likelihood difference becomes smaller than the likelihood difference judgment threshold S1, the probability of error recognition becomes greater than the probability of correct recognition, such that the probability of assuming correct recognition despite they are error recognition rises, and the reliability of correct recognition when they are judged to be correct recognition lowers. How the likelihood difference judgment threshold is to be set may be decided by the application of the speech recognition system 200, as described above.

FIG. 3B is a graph showing recognition distributions when the uttering speed is slower than the normal speed, wherein the value at which the number of appearance of the correct recognition distribution 322 and the number of appearance of the error recognition distribution 312 become the same is S2 that is greater than S1. Therefore, it is necessary to raise the likelihood difference judgment threshold to a greater value when the reliability judgment in the same conditions as those at the normal speed wants to be performed. Contrary to the case at the normal speed, when the likelihood difference judgment threshold is set at S1, even when the likelihood difference is greater than the likelihood difference judgment threshold S1, there exist cases where the probability of error recognition is higher than the probability of correct recognition.

Therefore, the value of the likelihood difference judgment threshold may preferably be changed according to the utterance speed. More specifically, the value of the likelihood difference judgment threshold may preferably be set greater as the utterance speed becomes slower.

FIG. 4 and FIG. 5 are tables for explaining examples of reliability judgment according to rates of speech in accordance with an embodiment of the invention.

Referring to FIG. 4, a reliability judgment method in accordance with the present embodiment will be described, using an example of reliability judgment made when speech data 1 of an utterance by the user 1 upon uttering "Ohayo" in Japanese, which means "Good morning" in English, at the normal speed (2 seconds in this example) is correctly recognized, and an example of reliability judgment made when speech data 2 of an utterance by the user 2 upon uttering "Ohayo" at the normal speed is erroneously recognized.

Here, the method will be described using an example of speech recognition of the type that judges as to which one of plural registered words prepared in advance (for example, registered words that are presented as choices in a scene when speech data is being uttered) corresponds to obtained speech data.

When the registered words prepared as choices are "Kon-nichi-wa" in Japanese, which means "Good Afternoon" in English, "Ohayo" in Japanese, which means "Good Morning" in Japanese, and "Kon-ban-wa" in Japanese, which means "Good Evening" in Japanese, the speech dictionary storage part 50 stores, corresponding to these registered words, acoustic models generated, using a Hidden Markov Model (HMM) technique, for example.

The speech recognition part 20 performs speech recognition by matching, using a Hidden Markov Model technique, for information based on speech data (for example, frequency spectrum signals), and acoustic models of the registered words prepared beforehand as choices, "Kon-nichi-wa", "Ohayo" and "Kon-ban-wa", calculates likelihoods, which are parameters each indicative of the probability of the speech data being each registered word, and outputs the recognition time in speech recognition.

An example of reliability judgment for the speech recognition result of speech data 1 will be described first. In this example, the user 1 utters "Kon-nichi-wa" (speech data 1) in two seconds, and the recognition result whose likelihood is at the first rank is "Kon-nichi-wa", in other words, is a correct recognition.

In this example, the likelihood obtained as a result of speech recognition by matching the speech data 1 with the acoustic model corresponding to "Kon-nichi-wa" is "78", the likelihood obtained as a result of speech recognition by matching the speech data 1 with the acoustic model corresponding to "Ohayo" is "30", and the likelihood obtained as a result of speech recognition by matching the speech data 1 with the acoustic model corresponding to "Kon-ban-wa" is "20".

Before judging the reliability according to likelihood differences, the speech recognition part 20 may compare the likelihood in each of the registered words to be selected with the lowest likelihood threshold, and may perform a likelihood judgment processing that judges, based on the comparison result, as to whether the likelihood of each of the registered words is to be adopted. Then, based on the likelihood difference for the registered word judged to be adopted, the reliability of speech recognition of speech data of the registered word whose likelihood is at the first rank may be judged. Note that the lowest likelihood threshold is a value with which a registered word is not considered to match speech data when the likelihood is smaller than this value.

More specifically, the speech recognition part 20 may compare each of the likelihoods obtained for the registered words "Kon-nichi-wa", "Ohayo" and "Kon-ban-wa" with the lowest likelihood threshold, and may perform reliability judgment using the likelihood difference for those of the registered words whose likelihood is greater than the lowest likelihood threshold. The likelihood difference judgment threshold may be a likelihood value obtained by speech recognition with the acoustic model of no sound or noise, for example, (in this case, the value may differ in each speech data). Also, when the utterance speed is slow, the speech recognition part 20 may change the lowest likelihood threshold to have a greater value, compared with the case when the utterance speed is faster.

For example, when the lowest likelihood threshold is "21", the speech recognition part 20 may adopt the likelihoods for "Kon-nichi-wa" and "Ohayo" for reliability judgment, because they are greater than the lowest likelihood threshold, but may not adopt the likelihood for "Kon-ban-wa" for reliability judgment because it is below the lowest likelihood threshold.

As for the speech data 1, the registered word whose likelihood is at the first rank is "Kon-nichi-wa" whose likelihood is "78", and the registered word whose likelihood is at the second rank is "Ohayo" whose likelihood is "30". Because both of the likelihoods exceed the lowest likelihood threshold, the reliability judgment part 30 performs reliability judgment, using the likelihood difference between the registered words whose likelihood are at the first rank and the second rank. The likelihood difference between the registered words whose likelihood are at the first rank and the second rank is 78−30=48.

When the reliability judgment part 30 performs reliability judgment, using the likelihood difference between the registered words whose likelihood are at the first rank and the second rank, a likelihood difference judgment threshold set for the acoustic model of the registered word whose likelihood is at the first rank obtained as a result of speech recognition of the speech data may be used.

The likelihood difference judgment threshold may be set for each acoustic model of each registered word. For example, when the likelihood of "Kon-nichi-wa" assumes the first rank, the reliability judgment part 30 may use a likelihood difference judgment threshold set corresponding to the acoustic model of "Kon-nichi-wa". Also, when the likelihood of "Ohayo" assumes the first rank, the reliability judgment part 30 may use a likelihood difference judgment threshold set corresponding to the acoustic model of "Ohayo". Furthermore, when the likelihood of "Kon-ban-wa" assumes the first rank, the reliability judgment part 30 may use a likelihood difference judgment threshold set corresponding to the acoustic model of "Kon-ban-wa".

The likelihood difference judgment threshold changes according to the utterance speed of the speech data. The speech recognition part 20 may judge the utterance speed according to the recognition time in speech recognition and the length of a registered word (acoustic model). As the length of a registered word, the length of a registered word whose likelihood is at the first rank may be used. In other words, the speech recognition part 20 may obtain the utterance speed to be recognized based on the recognition time in speech recognition and the length (for example, the number of vowels) of the acoustic model of a registered word whose likelihood is at the first rank. Note here that the recognition time in speech recognition (i.e., the speech recognition time) is the length of time obtained by subtracting the length of time required besides the calculation of the likelihood, such as, interrupt processing, etc. from the length of time elapsed from the start of speech recognition until the completion of calculation of the likelihood of each registered word to be recognized.

For example, because the number of vowels in "Kon-nichi-wa" is four, the speech recognition part 20 may divide two seconds of the speech recognition time by four, thereby obtaining the utterance speed of "0.5". Note that, in the present embodiment example and other embodiment examples hereinafter, the utterance speed at a standard speed or an average speed, which corresponds to the normal speed described above, will be called a reference speed.

The judgment reference change processing part 40 may set the likelihood difference judgment threshold (a reference likelihood difference judgment threshold 410) for the case where each registered word is uttered at the reference speed, associated with the acoustic model of each registered word, as shown in FIG. 4. Then, the judgment reference change processing part 40 may obtain a current likelihood difference judgment threshold 420 based on the reference likelihood difference judgment threshold 410 for the registered word whose likelihood is at the first rank and the utterance speed of the current speech data.

The judgment reference change processing part 40 may assume that the reference likelihood difference judgment threshold 410 and the current likelihood difference judgment threshold 420 corresponding to the current utterance speed is in a predetermined relation (for example, in a proportional relation, or a relation that can be defined by a predetermined function), and obtain the current likelihood difference judgment threshold 420 based on the reference likelihood difference judgment threshold 410 and the current utterance speed.

For example, for the acoustic model of the registered word "Kon-nichi-wa", assuming that the reference likelihood judgment threshold 410 at the reference speed (assumed to be "0.5" which is the same as the case when "Good afternoon" is uttered in two seconds) is "40", the current likelihood difference judgment threshold 420 becomes "40".

In the case of the speech data 1, because the registered word whose likelihood is at the first rank is "Kon-nichi-wa", the current likelihood difference judgment threshold 420 corresponding to "Kon-nichi-wa", which is "40", is used to judge the likelihood difference "48" between the registered word whose likelihood is at the first rank and the registered word whose likelihood is at the second rank. As indicated at (NOTE 1) in the figure, as the likelihood difference being 48>40, the reliability judged by using the current likelihood difference judgment threshold 420 becomes "◯" (the reliability of the speech data 1 being "Kon-nichi-wa" is high). That is, this indicates that there is a high possibility that the speech recognition result of the speech data 1 being "Kon-nichi-wa" is correct recognition.

Next, an example of reliability judgment for the speech recognition result of speech data 2 will be described. In this example, the user 2 utters "Kon-nichi-wa" (speech data 2) in two seconds, and the recognition result whose likelihood is at the first rank is "Kon-ban-wa", in other words, is error recognition.

In this example, the likelihood obtained as a result of speech recognition by matching the speech data 2 with the acoustic model corresponding to "Kon-nichi-wa" is "50", the likelihood obtained as a result of speech recognition by matching the speech data 2 with the acoustic model corresponding to "Ohayo" is "30", and the likelihood obtained as a result of speech recognition by matching the speech data 2 with the acoustic model corresponding to "Kon-ban-wa" is "80".

As for the speech data 2, the registered word whose likelihood is at the first rank is "Kon-ban-wa" whose likelihood is "80", and the registered word whose likelihood is at the second rank is "Kon-nichi-wa" whose likelihood is "50". Because both of the likelihoods exceed the lowest likelihood threshold, the speech recognition part 20 performs reliability judgment, using the likelihood difference between the registered words whose likelihood are at the first rank and the second rank. The likelihood difference between the registered words whose likelihood are at the first rank and the second rank is 80−50=30.

Because the number of vowels in "Kon-ban-wa" whose likelihood is at the first rank is three, the speech recognition part 20 may divide two seconds of the speech recognition time by 3, thereby obtaining the utterance speed of "0.66".

For example, for the acoustic model of the registered word "Kon-ban-wa", assuming that the reference likelihood judgment threshold 410 at the reference speed (assumed to be "0.66" which is the same as the case when "Good evening" is uttered in two seconds) is "41", the current likelihood difference judgment threshold 420 becomes "41".

In the case of the speech data 2, because the registered word whose likelihood is at the first rank is "Kon-ban-wa", the current likelihood difference judgment threshold 420 corresponding to "Kon-ban-wa", which is "41", is used to judge the likelihood difference "30" between the registered word whose likelihood is at the first rank and the registered word whose likelihood is at the second rank. As indicated at (NOTE 2) in the figure, as the likelihood difference being 30<41, the reliability judged by using the current likelihood difference judgment threshold 420 becomes "x" (the reliability of the speech data 2 being "Kon-ban-wa" is low). This therefore indicates that there is a high possibility that the speech recognition result of the speech data 2 being "Kon-ban-wa" is error recognition.

Referring to FIG. 5, examples of reliability judgment for speech recognition results in the case of utterance at a slower speed than the normal speed (for example, in 3 seconds) will be described.

First, an example of reliability judgment for the speech recognition result of speech data 3 will be described. In this example, the user 3 utters "Kon-nichi-wa" (speech data 3) in three seconds, and the registered word whose likelihood is at the first rank is "Kon-nichi-wa", in other words, is correct recognition.

In this example, the likelihood obtained as a result of speech recognition by matching the speech data 3 with the acoustic model corresponding to "Kon-nichi-wa" is "117", the likelihood obtained as a result of speech recognition by matching the speech data 3 with the acoustic model corresponding to "Ohayo" is "45", and the likelihood obtained as a result of speech recognition by matching the speech data 3 with the acoustic model corresponding to "Kon-ban-wa" is "30".

As for the speech data 3, the registered word whose likelihood is at the first rank is "Kon-nichi-wa" whose likelihood is "117", and the registered word whose likelihood is at the second rank is "Ohayo" whose likelihood is "45". Because both of the likelihoods exceed the lowest likelihood threshold, the speech recognition part 20 performs reliability judgment, using the likelihood difference between the registered words whose likelihood are at the first rank and the second rank. The likelihood difference between the registered words whose likelihood are at the first rank and the second rank is 117−45=62.

Because the number of vowels in "Kon-nichi-wa" whose likelihood is at the first rank is four, the speech recognition part 20 may divide three seconds of the speech recognition time by four, thereby obtaining the utterance speed of "0.75".

For example, for the acoustic model of the registered word "Kon-nichi-wa", assuming that the reference likelihood judgment threshold 410 at the reference speed (assumed to be "0.5" which is the same as the case when "Good afternoon" is uttered in two seconds) is "40", the current utterance speed is "0.75" which is 1.5 times faster.

When the utterance speed is multiplied by a factor x, the number of frames for speech data becomes multiplied by x (x>1), and there is a high possibility that the likelihood also becomes higher. Also, when the likelihood becomes multiplied by x, there is a high possibility that the likelihood difference becomes multiplied by x. Accordingly, the distribution of the likelihood difference in the correct recognition and the error recognition shown in FIGS. 3A and 3B will also broaden. In FIGS. 3A and 3B, the error recognition distribution 312 in FIG. 3B in which the utterance speed is slower becomes broader.

The judgment reference change processing part 40 uses an algorithm that increases the value of the likelihood difference judgment threshold as the utterance speed becomes slower. For example, the judgment reference change processing part 40 may use an algorithm in which the likelihood difference judgment threshold becomes $\{1+(x-1)/x\}$ times when the utterance speed becomes x times. When the utterance speed is 1.5 times the reference utterance speed as in the present embodiment example, the judgment reference change processing part 40 changes the likelihood difference judgment threshold to a value which is $\{1+(1.5-1)/2\}=1.25$ times the likelihood difference judgment threshold.

In the case of the speech data 3, because the registered word whose likelihood is at the first rank is "Kon-nichi-wa", as the current likelihood difference judgment threshold 420, "50" that is 1.25 times the reference likelihood difference judgment threshold 410 that is "40" corresponding to "Kon-nichi-wa" is used. By using this value, the likelihood difference "62" between the registered words whose likelihoods are respectively at the first rank and at the second rank is judged. As indicated at (NOTE 3) in the figure, as the likelihood difference being 62>50, the reliability judged by using the current likelihood difference judgment threshold 420 becomes "○" (the reliability of the speech data 3 being "Kon-nichi-wa" is high). That is, this indicates that there is a high possibility that the speech recognition result of the speech data 3 being "Kon-nichi-wa" is correct recognition.

Next, an example of reliability judgment for the speech recognition result of speech data 4 will be described. In this example, the user 4 utters "Kon-nichi-wa" (speech data 4) in three seconds, and the registered word whose likelihood is at the first rank is "Kon-ban-wa", in other words, is error recognition.

In this example, the likelihood obtained as a result of speech recognition by matching the speech data 4 with the acoustic model corresponding to "Kon-nichi-wa" is "75", the likelihood obtained as a result of speech recognition by matching the speech data 4 with the acoustic model corresponding to "Ohayo" is "45", and the likelihood obtained as a result of speech recognition by matching the speech data 4 with the acoustic model corresponding to "Kon-ban-wa" is "120".

As for the speech data 4, the registered word whose likelihood is at the first rank is "Kon-ban-wa" whose likelihood is "120", and the registered word whose likelihood is at the second rank is "Kon-nichi-wa" whose likelihood is "75". Because both of the likelihoods exceed the lowest likelihood threshold, the speech recognition part 20 performs reliability judgment, using the likelihood difference between the registered words whose likelihood are at the first rank and the second rank. The likelihood difference between the registered words whose likelihoods are respectively at the first rank and the second rank is 120−75=45.

Because the number of vowels in "Kon-ban-wa" whose likelihood is at the first rank is three, the speech recognition part 20 may divide three seconds of the speech recognition time by three, thereby obtaining the utterance speed of "1".

For example, for the acoustic model of the registered word "Kon-ban-wa", assuming that the reference likelihood judgment threshold 410 at the reference speed (assumed to be "0.66" which is the same as the case when "Kon-ban-wa" is uttered in two seconds) is "41", the current utterance speed is "1", which is about 1.5 times faster.

In the case of the speech data 4, because the registered word whose likelihood is at the first rank is "Kon-ban-wa", as the current likelihood difference judgment threshold 420, "52" that is 1.25 times the reference likelihood difference judgment threshold 410 that is "41" corresponding to "Kon-ban-wa" is used. By using this value, the likelihood difference "45" between the registered words whose likelihoods are respectively at the first rank and at the second rank is judged. As indicated at (NOTE 4) in the figure, as the likelihood difference being 45<52, the reliability judged by using the current likelihood difference judgment threshold 420 becomes "x" (the reliability of the speech data 4 being "Kon-ban-wa" is low). That is, this indicates that there is a high possibility that the speech recognition result of the speech data 4 being "Kon-ban-wa" is error recognition.

(NOTE 5) indicates the reliability judgment result upon judging the reliability of the speech data 4, within the range in which "41" that is the value of the reference likelihood difference judgment threshold 410 at the reference utterance speed is used. As indicated at (NOTE 5) in the figure, as the likelihood difference being 45≥41, the reliability becomes "○" (the reliability of the speech data 4 being "Kon-ban-wa" is high). That is, this indicates that there is a high possibility that the speech recognition result of the speech data 4 being "Kon-ban-wa" is correct recognition, despite that the speech data 4 is "Kon-nichi-wa".

If the speech recognition part 20 does not change the likelihood difference judgment threshold according to the utterance speed, there is a possibility to provide a judgment of correct recognition despite that it is error recognition. However, such an incident as in the case of (NOTE 5) can be prevented, when the speech recognition part 20 changes the likelihood difference judgment threshold according to the utterance speed.

Embodiment Example 2

Figure 6:
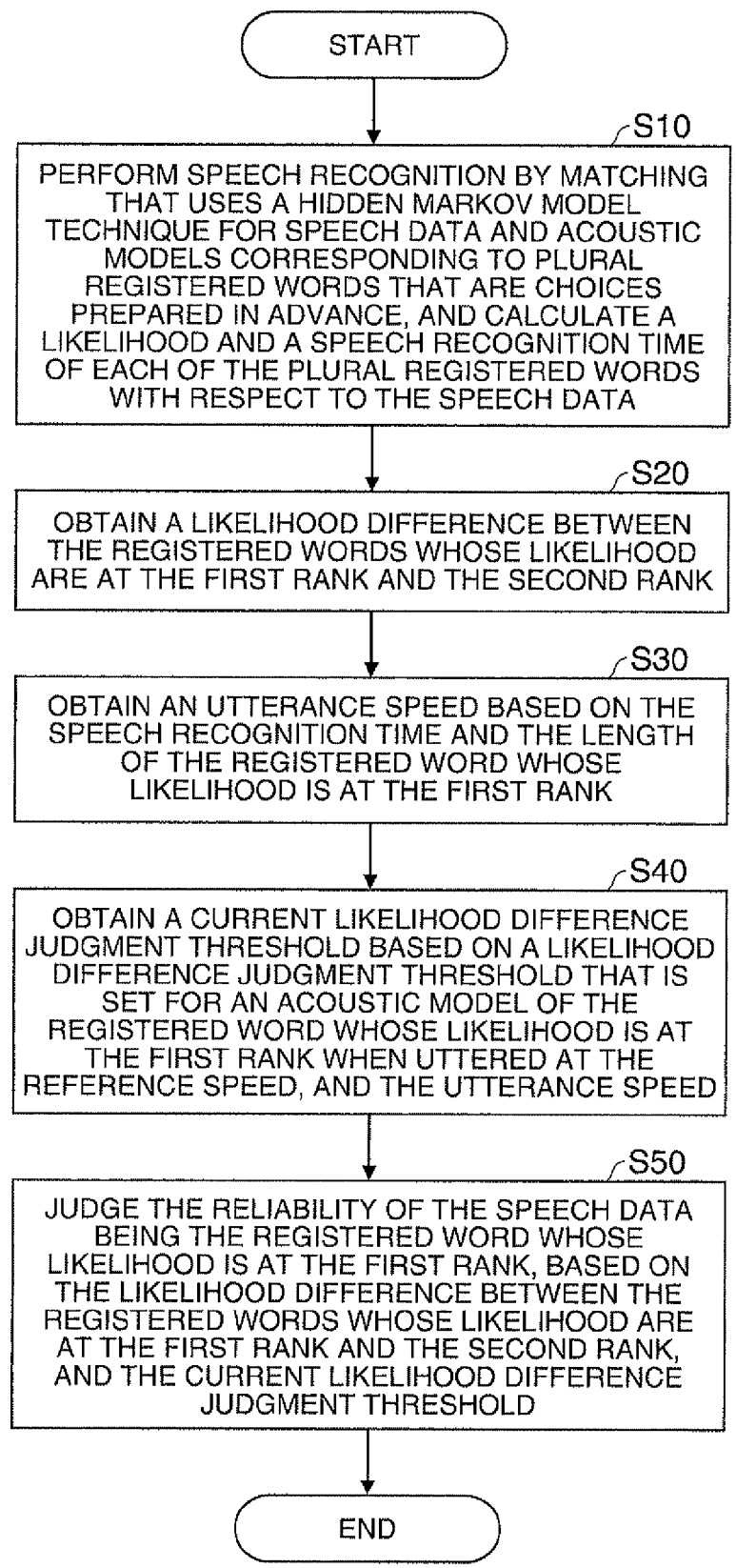
FIG. 6 is a flow chart showing the flow of a reliability judgment processing in accordance with an embodiment of the invention.

This embodiment example explains a flow of the reliability judgment processing in the speech recognition system in accordance with the present embodiment. FIG. 6 is a flow chart showing a part of the flow of the reliability judgment processing.

The speech recognition system in accordance with the present embodiment example performs speech recognition by matching that uses a Hidden Markov Model technique for speech data and acoustic models corresponding to plural registered words that are choices prepared in advance, and calculates a likelihood and a speech recognition time of each of the plural registered words with respect to the speech data (step S10).

Then, the speech recognition system in accordance with the present embodiment example obtains a likelihood difference between the registered words whose likelihood are at the first rank and the second rank (step S20). The speech recognition system in accordance with the present embodiment example then obtains an utterance speed from the speech recognition time and the length of the registered word whose likelihood is at the first rank (step S30). Then, the speech recognition system in accordance with the present embodiment example obtains a current likelihood difference judgment threshold based on a likelihood difference judgment threshold that is set for an acoustic model of the registered word whose likelihood is at the first rank when uttered at the reference speed, and the utterance speed (step S40).

Then, the speech recognition system in accordance with the present embodiment example judges the reliability of the speech data being the registered word whose likelihood is at the first rank, based on the likelihood difference between the registered words whose likelihood are at the first rank and the second rank, and the current likelihood difference judgment threshold (step S50).

Though embodiments and application examples of the invention have been described above, the invention is not limited to the embodiments and application examples described above, and many changes can be made within the range of the subject matter of the invention.

The invention may include compositions that are substantially the same as the compositions described in the embodiments (for example, a composition with the same function, method and result, or a composition with the same objects and effects). Also, the invention includes compositions in which portions not essential in the compositions described in the embodiments are replaced with others. Also, the invention includes compositions that achieve the same functions and effects or achieve the same objects of those of the compositions described in the embodiments and application examples. Furthermore, the invention includes compositions that include publicly known technology added to the compositions described in the embodiments. The invention is widely applicable within the range that does not depart from the subject matter of the invention.

What is claimed is:
1. A speech recognition system that recognizes speech data, the speech recognition system comprising:
a speech recognition part that performs speech recognition of the speech data, and calculates a likelihood of the speech data with respect to a registered word that is pre-registered;
a reliability judgment part that performs reliability judgment on the speech recognition based on the likelihood; and a judgment reference change processing part that changes a judgment reference for the reliability judgment, according to an utterance speed of the speech data.

2. The speech recognition system according to claim 1, wherein
the reliability judgment part performs the reliability judgment for judging the reliability of the speech recognition based on a comparison result between a likelihood difference judgment threshold and a likelihood difference that is a difference in the likelihood among a plurality of the registered words obtained as a result of the speech recognition, and
the judgment reference change processing part changes the likelihood difference judgment threshold to be used for the reliability judgment to have a greater value, as the utterance speed becomes slower.

3. The speech recognition system according to claim 2, wherein
the likelihood difference judgment threshold is set corresponding to an acoustic model of each of the registered words, and
the reliability judgment part use the likelihood difference judgment threshold set corresponding to an acoustic model of a first registered word whose likelihood obtained as a result of the speech recognition is at the first rank, thereby judging the reliability of the speech data being the first registered word.

4. The speech recognition system according to claim 3, wherein the judgment reference change processing part judges the utterance speed of the speech data based on the recognition time in speech recognition of the speech data and the number of vowels in an acoustic model of the registered word.

5. The speech recognition system according to claim 4, wherein the reliability judgment part obtains the likelihood difference between the first registered word and a second registered word whose likelihood is at the second rank, and judges the reliability of the speech data being the first registered word based on the result of comparison between the likelihood difference and the likelihood difference judgment threshold.

6. The speech recognition system according to claim 1, wherein the judgment reference change processing part determines the utterance speed.

7. A non-transitory computer-readable medium storing a speech recognition program, the speech recognition program that renders a computer to function as:
a speech recognition part that performs speech recognition of speech data, and calculates a likelihood of the speech data with respect to a registered word that is pre-registered;
a reliability judgment part that performs reliability judgment on the speech recognition based on the likelihood; and
a judgment reference change processing part that changes a judgment reference for the reliability judgment, according to an utterance speed of the speech data.

8. A speech recognition method for performing speech recognition of speech data, and the method comprising:
a speech recognition step of performing the speech recognition and calculating a likelihood of the speech data with respect to a registered word that is pre-registered;
a judgment reference change processing step of changing a judgment reference for reliability judgment according to an utterance speed of the speech data; and
a reliability judgment step of performing reliability judgment on the speech recognition based on the likelihood.

* * * * *